(12) United States Patent
De Crecy et al.

(10) Patent No.: US 7,572,053 B2
(45) Date of Patent: Aug. 11, 2009

(54) TIGHTNESS TEST FOR MEMS OR FOR SMALL ENCAPSULATED COMPONENTS

(75) Inventors: Francois De Crecy, Seyssins (FR); Bernard Diem, Echirolles (FR)

(73) Assignee: Commissariat a l'Energie Atomique, Paris (FR)

( * ) Notice: Subject to any disclaimer, the term of this patent is extended or adjusted under 35 U.S.C. 154(b) by 39 days.

(21) Appl. No.: 11/630,471

(22) PCT Filed: Jun. 29, 2005

(86) PCT No.: PCT/FR2005/050523

§ 371 (c)(1),
(2), (4) Date: Dec. 21, 2006

(87) PCT Pub. No.: WO2006/008412

PCT Pub. Date: Jan. 26, 2006

(65) Prior Publication Data

US 2007/0234782 A1    Oct. 11, 2007

(30) Foreign Application Priority Data

Jun. 30, 2004   (FR) .................................. 04 51370

(51) Int. Cl.
*G01K 1/00* (2006.01)
*G01K 7/00* (2006.01)

(52) U.S. Cl. .............................. 374/5; 374/57; 374/208; 374/141

(58) Field of Classification Search .................. 374/4, 374/5, 45, 141, 208, 43
See application file for complete search history.

(56) References Cited

U.S. PATENT DOCUMENTS

| 4,682,503 | A | 7/1987 | Higashi et al. |
|---|---|---|---|
| 4,812,801 | A | 3/1989 | Halvis et al. |
| 5,347,869 | A | 9/1994 | Shie et al. |
| 6,019,505 | A | 2/2000 | Bonne et al. |
| 6,205,846 | B1 * | 3/2001 | Dupraz et al. ............... 73/40 |
| 2003/0073292 | A1 | 4/2003 | Bartlett et al. |
| 2005/0028582 | A1 | 2/2005 | Schatz et al. |

FOREIGN PATENT DOCUMENTS

| FR | 2 824 911 | 11/2002 |
|---|---|---|
| WO | 2005 098386 | 10/2005 |

OTHER PUBLICATIONS

Puers, R. et al., "The NanoPirani- and Extremely Miniaturized Pressure Sensor Fabricated by Focused Ion Beam Rapid Prototyping", Sensors and Actuators, vol. 97-98, pp. 208-214, 2002.

* cited by examiner

*Primary Examiner*—Lisa M Caputo
*Assistant Examiner*—Mirellys Jagan
(74) *Attorney, Agent, or Firm*—Oblon, Spivak, McClelland, Maier & Neustadt, P.C.

(57) ABSTRACT

A tightness testing method for a MEMS or small encapsulated component, the MEMS or small component being housed in a cavity of a carrier. The cavity being sealed and containing a gas having a different density to the density it would have if subjected to the pressure of the medium outside the cavity. The method measures the density of the gas contained in the cavity.

10 Claims, 4 Drawing Sheets

TIGHTNESS TEST FOR MEMS OR FOR SMALL ENCAPSULATED COMPONENTS

TECHNICAL AREA

The invention concerns the testing of the tightness seal of MEMS or small encapsulated components.

The object is to verify the tightness of small devices containing inner cavities which are normally under a pressure different to air pressure or to the pressure of the environment in which the MEMS or small device are intended to operate. It therefore also applies to verifying the tightness of encapsulated MEMS. It is often necessary, in order to guarantee reliable, lasting, proper functioning of the MEMS or small device, to be able to guarantee the seal of the cavity.

One particular case for this need is when proper functioning requires the quantity of gas (this quantity possibly being zero if the cavity is to be maintained in a vacuum) to remain constant in the cavity. By way of example, numerous types of pressure sensors, accelerometers and gyrometers have this constraint.

Another particular case for this need is when the proper functioning or safety constraints require that there be no contamination, in either direction, between the fluid contained in the cavity and the outside environment. For example, numerous types of MEMS or small devices intended to be integrated in specific environments (living organisms, marine or undersea environment, aggressive chemical surroundings, space, . . . ) have this constraint. Often, devices having electric conductors or semiconductors in direct contact with the cavity, require their maintaining in a controlled atmosphere to avoid oxidation for example. In this case, even contact with normal atmosphere may be very harmful.

A non-destructive verifying method is therefore necessary which can be implemented both during the manufacturing process of the MEMS or small device, and subsequently during normal use of the MEMS or small device, or for servicing purposes to verify the proper functioning of the MEMS or device.

PRIOR ART

To solve this problem, one first solution is to endeavour to fill the inner cavity of the MEMS or small device by placing the MEMS or small device in a chamber filled with a fluid A (gas or liquid) at a much higher pressure than the pressure under which the inner cavity of the MEMS or small device should be held. If there are seal defects, the external fluid enters into the cavity. After external rinsing, the MEMS or small device is then placed in another chamber under low pressure, equipped with a detector highly sensitive to fluid A (or its vapour if A is a liquid), e.g. a mass spectrometer. If fluid A is detected, this means that there is a tightness defect.

Patents GB 1 213 406 and U.S. Pat. No. 4,920,785 describe examples implementing this method. For the purpose of increasing sensitivity, various techniques are used to promote complete degassing of the cavity of the MEMS or small device e.g. by heating, mechanical vibration or ultrasound.

This direct testing of the tightness of the cavity of MEMs or small devices is a cumbersome, complex method that cannot be performed collectively, and is often difficult to reproduce throughout the lifetime of the MEMS or small device to verify the proper functioning thereof. It requires a highly sensitive fluid detector, this type of apparatus often being complex and/or costly. If it is performed collectively on a certain number of MEMS or small devices e.g. on a fabrication wafer before cutting out the MEMS, a leak on only one of the devices leads to the discarding of the entirety of the tested devices.

It could be considered to incorporate pressure sensors in the encapsulated MEMS or small devices. Numerous types of pressure sensors exist which are also MEMS. A description of the main types of pressure sensors which can be fabricated in MEMS form is given in <<The MEMS Handbook>> by Mohamed Gad-el-Hak, 2002, CRC Press (see chapter 25, title: <<Micromachined Pressure Sensors>>).

The most frequently used principle in this type of sensor is to apply the pressure to be measured on one side of a thin tight membrane, whose other side is in contact with a known pressure, e.g. a vacuum. The difference in pressure either side of the membrane exerts stresses on this membrane which cause deformations and movements of the membrane. Either the stresses on this membrane are measured directly (e.g. using piezoresistive gauges, optionally integrated in the membrane or using resonant structures whose resonance frequency is stress-dependent), or the movement of this membrane is measured (e.g. using optical or capacitive methods, tunnel effect or its consequences on heat transfers).

Another principle used to measure the pressure of a gas is the dependency of heat exchanges on gas pressure. The sensors using this type of physical principle are sometimes called <<Pirani-type sensors>>. They are often used to measure fairly low pressures, in the Pa range (at times from $10^{-1}$ or $10^{-2}$ Pa) to a few kPa (at times up to pressures higher than 1 bar). One conventional method of producing this type of sensor is to have a heating resistance (generally by Joule effect) which evacuates its power through the gas whose pressure it is sought to determine, towards a solid substrate which acts as cold source. The power of the heating resistance, its temperature and the temperature of the cold source are measured, making it possible to deduce therefrom the conditions of heat exchange and hence the pressure of the gas.

The design and technology of all these MEMS devices for measuring pressure are optimized to carry out this pressure sensor function.

The incorporation of a pressure sensor within the cavity of the MEMS or small device is a costly, complex method of proceeding which often requires extensive modification of fabrication processes initially designed or optimized for the main function of the MEMS or small device, and in some cases may entail unacceptable space requirements. In addition, there are cases when it is impossible to incorporate a pressure sensor whilst maintaining the main function of the MEMS or small device.

DESCRIPTION OF THE INVENTION

To overcome the disadvantages of the prior art, the present invention proposes the incorporation of a simplified detector within the cavity to detect gas density, inspired from Pirani-type pressure sensors and using the same techniques and/or methods as those designed and optimized for the main function of the MEMS or small device. For this purpose, use is made of the fact that when the mean free path of molecules is no longer very small compared with the dimensional characteristic of gas thickness, a temperature jump occurs in the vicinity of a heat-exchanging wall as modelled over one century ago by von Smoluchowski (1898) as:

$$T_{gas} - T_{wall} = \frac{2-\sigma_T}{\sigma_T} \cdot \frac{2\gamma}{\gamma+1} \cdot \frac{L}{\text{Pr}} \cdot \vec{\nabla} T_{gas} * \vec{n}$$

wherein $\sigma_T$: coefficient of thermal accommodation, between 0 and 1, dependent on the surface properties and type of gas. It is often taken to be in the order of 0.75 to 1.

$\gamma = C_p/C_v$: isentropic coefficient of the gas, typically in the order of 1.4 for a diatomic gas.

Pr: number of Prantl of the gas, typically in the order of 0.71. It depends little on pressure but rather more on temperature.

L: mean free path of the molecules. L depends on the density of the gas.

n: normal vector at the wall, oriented towards the gas.

The temperature jump such as modelled above is valid up to a certain maximal value of the Knudsen number, the ratio of the mean free path of the molecules over the geometric dimensional characteristic of the problem. This maximal value varies according to author between 0.13 to 0.6.

By way of example, persons skilled in the art can easily show that for simplistic geometries (parallel plates, coaxial cylinders, ... ) this limit condition associated with conventional equations for thermal conduction under a steady state (equations which remain valid over this Knudsen range) is equivalent to distancing each wall over a distance $\alpha$ defined by:

$$\alpha = \frac{2-\sigma_T}{\sigma_T} \cdot \frac{2\gamma}{\gamma+1} \cdot \frac{L}{\text{Pr}}$$

For gas between two parallel plates, the conventional formulas must be modified by increasing the thicknesses of the gas by $2\alpha$.

The fact that the purpose is not to achieve a precise sensitive <<measurement>> of gas density, but only to detect <<large>> variations in gas density inside the cavity means that design constraints for the detector can be considerably slackened. (It is recalled that for a closed, constant volume of gas the density is necessarily constant. Any tightness defect vis-à-vis an environment under different pressure would translate as a variation in the total weight of the gas and hence in the density of the gas). For example, all that is needed is to have a structure in the cavity heating under Joule effect which exchanges its heat either with a cold source (e.g. formed by the most solid parts of MEMS or small device in heat contact with the environment) or with another structure, and to measure the temperature or temperature changes of the cold source or other structure. This provides access to the conditions of heat exchange and in particular to the share of global heat exchange passing via conduction or convection through the gas. Knowing the thermal resistance of this gas, its type and the geometry of the sensor, it is possible to deduce therefrom an estimate of its density.

For example, one mode of use may consist of deducing thermal resistance from electric power and temperature measurements (which is trivial: Rth=Power/$T_{hot}-T_{cold}$) in the case of a steady state with a single heating resistance and one cold source), then of deducing that part of this thermal resistance that is due to transfer in the gas (which is within the reach of those skilled in the art, e.g. heat physicists). It is then possible to deduce an estimate of the density. These calculations may be performed analytically when geometries are simple, or may require the use of calculation codes for complex geometries. It is also possible for the test method designer to establish graphs or simple analytical formulas which can be used by the user or a computer system to easily deduce the density of the gas.

This non-destructive estimation (or test) can be performed entirely by electric measurements, both after manufacture and throughout the lifetime of the MEMS or small device. It only requires simple, standard electric measurement apparatus.

The subject-matter of the invention is therefore a tightness testing method for a MEMS or small encapsulated component, the MEMS or small component being housed in a cavity of a carrier, the cavity being sealed by sealing means and containing a gas having a different density to the density it would have if subjected to the pressure of the medium outside the cavity, the method being characterized in that it comprises a measurement step to measure the density of the gas contained in the cavity, the cavity being provided with a heating structure and temperature measuring means.

Advantageously, the measurement step of gas density comprises the producing of a heat exchange between a hot source present in the cavity and a cold source thermally linked to the cavity, and determining a characteristic magnitude of this heat exchange.

Determining the characteristic magnitude of the heat exchange may comprise determination of the temperature or temperature changes of the cold source and/or hot source.

According to one embodiment, the hot source being an electric resistance of known resistance, the determination of the temperature of the hot source is obtained by measuring the voltage applied to its terminals and the current passing through it. If the electric resistance has a DC voltage input, measurement of the density of the gas is obtained from the thermal resistance through the gas contained in the cavity.

According to another embodiment, the hot source consists of two electric resistances mounted on two opposite sides of a Wheatstone bridge having a DC voltage input on two opposite top parts, the two other electric resistances of the Wheatstone bridge being in contact with the cold source, the voltage measured on the two other opposite top parts of the Wheatstone bridge being used to measure the density of the gas contained in the cavity.

According to another embodiment, the hot source being an electric resistance of known resistivity, a voltage scale is applied to its terminals and the time response is measured of the electric resistance forming the hot source to determine the thermal resistance between the hot source and the remainder of the cavity.

According to yet another embodiment, the hot source being an electric resistance of known resistivity, a sinusoidal voltage is applied to its terminals and the time response of this electric resistance is measured, from which the thermal resistance can be deduced between the hot source and the remainder of the cavity.

According to a further embodiment, the hot source consists of two electric resistances mounted on two opposite sides of a Wheatstone bridge having an AC voltage input on two opposite top parts, the two other electric resistances of the Wheatstone bridge being in contact with the cold source, the voltage measured on the two other opposite top parts of the Wheatstone bridge being used to obtain the thermal time response of the hot source, from which the thermal resistance can be deduced between the hot source and the remainder of the cavity.

The hot source may be a hot source fabricated during a fabrication process used to fabricate the main function of the MEMS or small component.

The electric resistances of the Wheatstone bridge may be electric resistances fabricated during a fabrication process used to fabricate the main function of the MEMS or small component.

A further subject of the invention is a device comprising a MEMS or small encapsulated component, the MEMS or small component being housed in a cavity of a carrier, the cavity being sealed by sealing means and containing a gas having a different density to the density it would have if subjected to the pressure of the medium outside the cavity, characterized in that a density sensor is also housed in the cavity, the latter being provided with a heating structure and with temperature measuring means.

The MEMS or small component and the density sensor may be elements fabricated during a fabrication process that is optimized for the main function of the MEMS or small component.

BRIEF DESCRIPTION OF THE DRAWINGS

The invention will be better understood and other advantages and characteristics will become apparent on reading the following description given as a non-limiting example together with the appended drawings among which.

DETAILED DESCRIPTION OF PARTICULAR EMBODIMENTS

Figure 1:
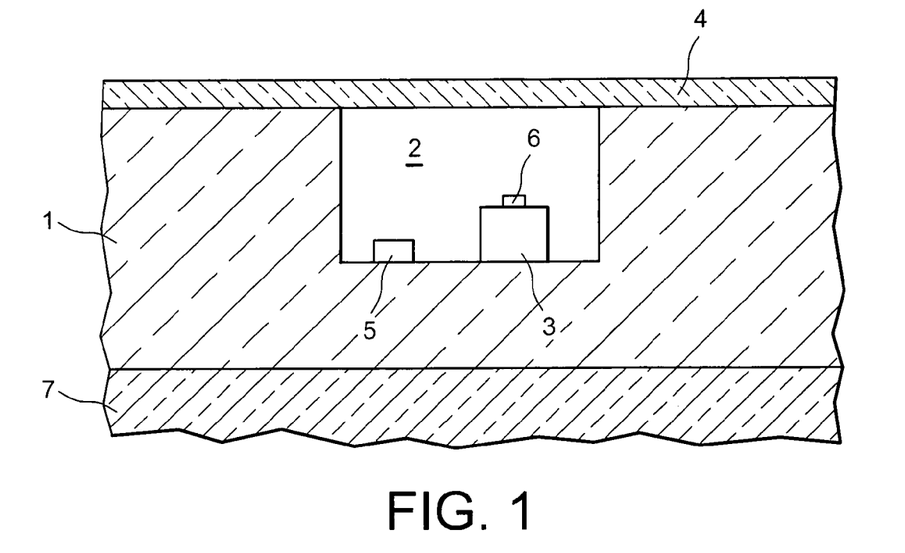
FIG. 1 is a cross-sectional view of a device comprising an encapsulated MEMS to which the method of the present invention applies.

FIG. 1 is a cross-sectional view of a device comprising an encapsulated MEMS to which the inventive method applies.

The device in FIG. 1 is made on a substrate 1, e.g. in silicon, comprising a cavity 2. The cavity 2 contains a MEMS 3. It is closed by a thin film 4 acting as lid whose tightness is to be tested. The cavity 2 is either void or filled with a gas whose density is different to the density it would have if subjected to the pressure of the outside medium (on the other side of the thin film 4), this gas possibly being other than air. To control the seal of the encapsulated MEMS, according to the invention the density of the gas contained in cavity 2 is measured. For this purpose, the cavity is provided with a heating structure 5, advantageously having a large heat exchange surface with the gas, and temperature measuring means 6 positioned on the MEMS 3 which are thermally linked to the cold source 7.

As a variant, the means 6 can also be positioned on the wall of the cavity, itself thermally linked to the cold source or being directly in contact with this cold source.

The connections of the heating structure and temperature measuring means are not shown. The implementation of the testing method will be explained in more detail below, with reference to several examples of embodiment.

One first example of embodiment corresponds to simple assembly and measurement.

Within the cavity, a structure heating under Joule effect exchanges its heat with a cold source, e.g. consisting of the most solid parts of the MEMS or small component in thermal contact with the environment. The fabrication of this structure must be compatible with the process allowing the MEMS or small device to carry out its main function. This structure must exchange the maximum amount of its power via the gas and its minimum amount via conduction through the solid parts. For this purpose, one example of embodiment may provide this heating structure with a certain number of fins interdigited with fins linked to the substrate or cold source.

For the best possible sensitivity of the device, it is desirable that the dimensional characteristic of the gas space through which the heat flow passes between the hot part and cold part should be in the order of 2 to 15 times the mean free path of the molecules of this gas under the desired density conditions within the cavity.

This heating structure is made in a conductor or semiconductor whose resistivity varies with temperature in known manner. For the sensitivity of the device to be the best possible, it is desirable that the temperature dependence of the heating resistance should be maximum. Both voltage and intensity are measured at the terminals of the structure, making it possible to estimate released power and resistance and hence temperature. If the temperature of the cold source is measured or is known, it is possible to deduce therefrom an estimation of the density as explained above.

One major advantage of this type of assembly (an advantage which will be found in the other examples given below) is that it is very often possible to fabricate this heating structure making very few changes to the fabrication process such as designed and optimized for the function of the MEMS or small component. This was particularly researched in respect of an accelerometer. Evidently, the sensitivity and accuracy will not be as good they could be if the heating structure had been optimised to become a gas density sensor, but the sensitivity remains sufficient for a tightness detector.

A second example of embodiment corresponds to a Wheatstone bridge assembly and simple measurement. This example is illustrated FIG. 2.

Figure 2:
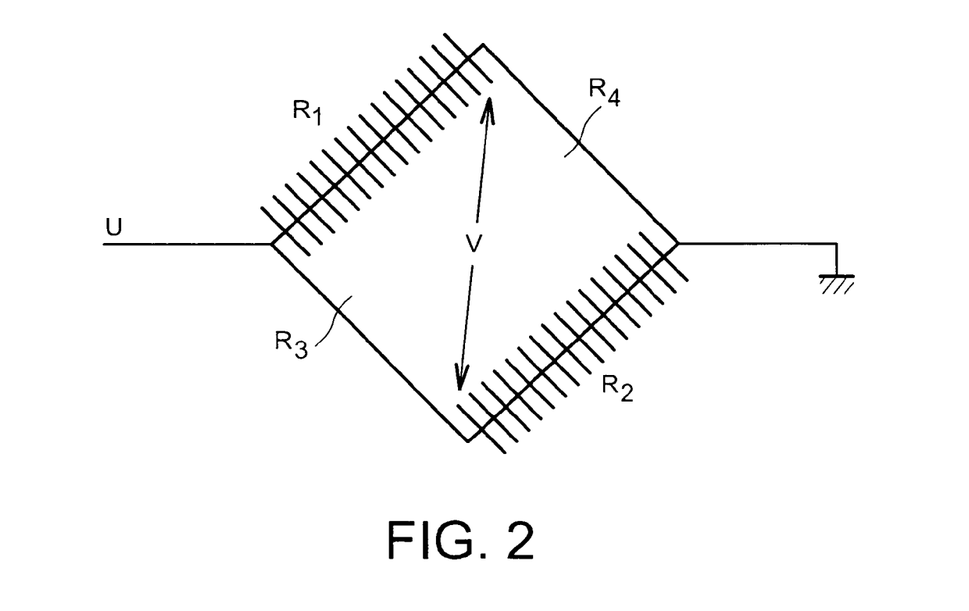
FIG. 2 is an electrical diagram showing a Wheatstone bridge used for the inventive testing method.

Two heating resistances $R_1$ and $R_2$ (hot source), intended for maximum power exchange via the gas contained in the cavity, are mounted on two opposite sides of a Wheatstone bridge. These resistances are provided with interdigited fins. The heat exchange between these resistances and the cold source is sensitive to the density of the gas contained in the cavity. The two other sides of the Wheatstone bridge consist of resistances $R_3$ and $R_4$ which exchange the least possible power via the gas and/or whose resistivity varies the least possible with temperature. Resistances $R_3$ and $R_4$ may be arranged over an electric insulator layer that is as thin as possible and thermally as conductive as possible, e.g. silicon nitride. This thin layer of electric insulator and heat conductor is itself arranged as close as possible to the cold source (e.g. the substrate for a MEMS, or the most solid part of a small component). On this account, the temperature of resistances $R_3$ and $R_4$ varies little with heat exchange conditions (and hence with the density of the gas). On the contrary, resistances $R_1$ and $R_2$ vary substantially with heat exchange conditions (and hence with the density of the gas). On this account, the imbalance of the Wheatstone bridge depends on the density of the gas. Persons skilled in the art know that the sensitivity of a Wheatstone bridge is maximal when the nominal resistances (i.e. under nominal power supply and gas density conditions) are of the same order of magnitude for the 4 sides of the bridge.

Under the effect of a voltage U applied to the bridge, as indicated FIG. 2, a voltage V can be measured. Voltage V depends upon the imbalance of the bridge. As a first approximation and for low variations in resistance, this voltage variation is inversely proportional to the variation in the density of the gas.

A third example of embodiment corresponds to easy assembly and pulse measurement.

This example of embodiment reproduces the heating structure of the first embodiment. The basic idea is to measure the thermal resistance between the structure and its environment using the fact that it determines the thermal response time of this structure. A voltage scale is applied to its terminals and the time response of the electric resistance is measured, making it possible to find the thermal time response of this structure and hence the thermal resistance between this structure and its environment. The density of the gas can be deduced therefrom.

So that this solution is sufficiently sensitive to the density of the gas, the ratio of the time characteristic for establishing internal thermal equilibrium of the heating structure over the time characteristic for establishing thermal equilibrium of the heating structure with respect to its environment must be less than 1. (This ratio corresponds to what is called the Biot number by heat physicists). If this ratio is less than 1, the variations in temperature inside the heating structure will be small compared with the difference between the temperature of the heating structure and the temperature of the environment or cold source. This ratio can be estimated by those skilled in the art if they know the thermal properties and geometry of the structure and its surrounding gas.

A fourth example of embodiment corresponds to easy assembly and sinusoidal measurement.

This example of embodiment reproduces the heating structure of the first example of embodiment. As for the third example of embodiment, the basic idea is to measure the thermal resistance between the heating structure and the cold source using the fact that it determines the thermal response time of this heating structure. A sinusoidal voltage of frequency f, to which a DC component is optionally added, is applied to its terminals and the time response of the electric resistance is measured, which gives the thermal response time of this heating structure and hence the thermal resistance between this structure and the cold source. The density of the gas is deduced therefrom.

If the sinusoidal voltage of the electric supply has no DC component, those skilled in the art can easily show that the electric resistance and the temperature of the heating structure are described by the sum of a constant function and a series of sinusoidal functions of frequencies 2f, 4f, 6f, . . . phase shifted by $\phi_2, \phi_4, \phi_6$ . . . These phase shifts depend, inter alia, on the thermal resistance between the heating structure and the cold source or the solid part of the MEMS or small component. Those skilled in the art know how to measure these phase shifts and to use these measurements to estimate thermal resistance, and hence the density of the gas. The sensitivity of the phase shift $\phi_2$ of the first harmonic (of frequency 2f) to the value of the thermal resistance between the heating structure and the cold source is maximal when the thermal response time of the structure with respect to its nominal environment is approximately one quarter of the period of the electric excitation signal.

If the sinusoidal voltage of the electric supply has a non-zero DC component, those skilled in the art may easily show that the electric resistance and the temperature of the heating structure are described by the sum of a constant function and a series of sinusoidal functions of frequencies f, 2f, 3f, 4f, . . . phase-shifted by $\phi_1, \phi_2, \phi_3, \phi_4$ . . . These variations and resistance phase shifts can be measured by those skilled in the art using measurements of the variations and phase shifts of the currents passing through the resistance. These phase shifts depend, inter alia, on the thermal resistance between the heating structure and the cold source or the solid part of the MEMS or small component. Those skilled in the art know how to measure these phase shifts and to use these measurements to estimate thermal resistance and hence the density of the gas.

As an example, in the case when the DC component of the applied signal is zero, those skilled in the art can easily show that a first rough approximation of phase shift (delay) of the temperature of the heating structure with respect to the square of the supply voltage, not taking into account inter alia the effects of non-linear dependency of the electric conductibility of the heating structure on temperature, is given by:

$$\varphi_1 = \mathrm{arc}tg[(\omega_0 - Q_{0\cdot\gamma})/\omega] - \pi/2$$

where $\omega_0 = \dfrac{K}{2MC_p}$, $Q_0 = \dfrac{W_0}{2MC_p}$, $\gamma = \dfrac{1}{s} \cdot \dfrac{\partial s}{\partial T}$ et $W_0 = \dfrac{U_0^2}{2R_0}$ wherein K: total thermal conductance between the heating structure and the cold source, M: thermal mass of the heating structure, $C_p$: mean calorific capacity of the heating structure, s: electric conductance (inverse of electric resistance) of the heating structure, T: temperature, ω: sinusoidal frequency pulse of electric supply, $U_0$: amplitude of the sinusoidal frequency of electric supply, $R_0$: value of the electric resistance of the heating structure at mean temperature.

One advantage of this example of embodiment of the invention is that it is often easier to measure a phase shift rather than a true thermal response time, as proposed in the third example of embodiment.

If it is possible to measure the temperature of the heating structure using an independent method, e.g. by incorporating a thermometric probe in the heating structure, then this example of embodiment can be used even if the variation in resistivity of the heating structure is low or zero.

As in the case of the third example of embodiment, for this solution to be sufficiently sensitive to the density of the gas and for the preceding approximation to be valid, the ratio of the time characteristic for establishing internal thermal equilibrium of the heating structure over the time characteristic for establishing thermal equilibrium of the heating structure with respect to the cold source must be less than 1. (This ratio corresponding to what is called the Biot number by heat physicists). If this ratio is less than 1, the variations in temperature inside the heating structure are low compared with the difference between the temperature of the structure and the temperature of the cold source. This ratio can be estimated by persons skilled in the art if they know the thermal properties and geometry of the structure and of its surrounding gas.

A fifth example of embodiment corresponds to a Wheatstone bridge assembly and sinusoidal measurement.

This example of embodiment reproduces the heating structure of the second example of embodiment. As for the third and fourth examples of embodiment, the basic idea is to measure the thermal resistance between the heating structure and the cold source using the fact that it determines the thermal response time of this structure. A sinusoidal voltage of frequency f, to which a DC component is optionally added, is applied to the input terminals of the Wheatstone bridge, and the time response is measured (in particular its phase shift) on the measurement diagonal of the Wheatstone bridge, which makes it possible to obtain the thermal response time of this structure and hence the thermal resistance between this structure and the cold source. The density of the gas is deduced therefrom.

One advantage of this example of embodiment is that it is often easier to measure a phase shift rather than a true thermal response time, as proposed in the third example of embodiment, and the part of the measurement signal that is dependent on gas density on the measurement diagonal of the Wheatstone bridge is proportionally greater than in the fourth example of embodiment.

As in the case of the third and fourth examples of embodiment, for this solution to be sufficiently sensitive to the density of the gas, the ratio of the time characteristic for establishing the inner thermal equilibrium of the bridge elements for which heat exchange is sensitive to gas pressure over the time characteristic for establishing the thermal equilibrium of these elements with respect to the cold source must be less than 1. (This ratio corresponds to what is called the Biot number by heat physicists). If this ratio is less than 1, the variations in temperature inside the heating structure are small compared with the difference between the heating resistance and the temperature of the cold source. This ratio can be estimated by those skilled in the art if they know the thermal properties and geometry of the structure and its surrounding gas.

FIGS. 3A to 3F are cross-sectional views illustrating a method for fabricating a device comprising an encapsulated MEMS and means to allow implementation of the tightness testing method according to the present invention.

Figure 3A:
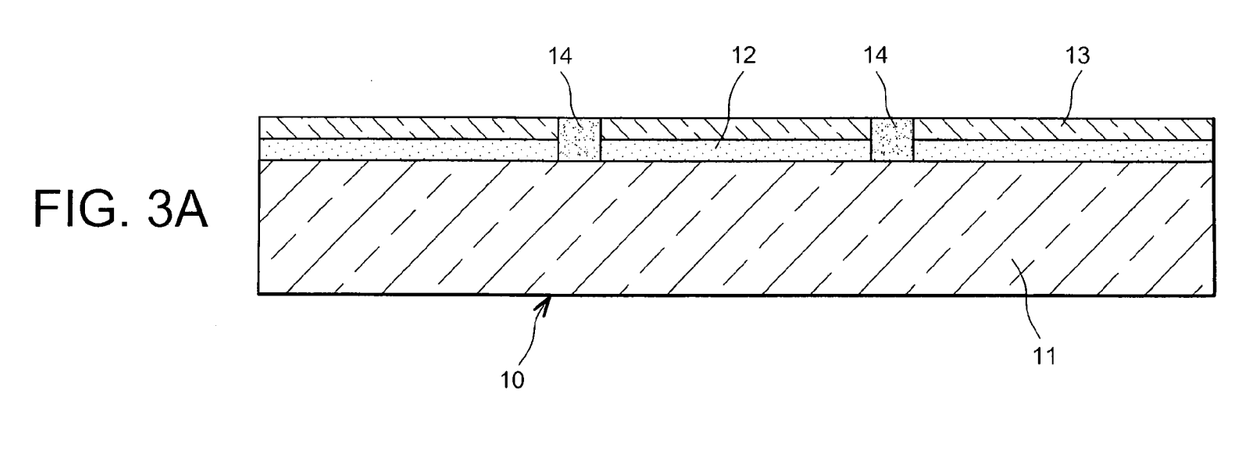
FIGS. 3A to 3F illustrate a process for fabricating a device comprising an encapsulated MEMS and means enabling the implementation of the inventive testing method.

FIG. 3A shows a SOI substrate 10 comprising a carrier 11 in silicon successively carrying a layer of silicon oxide 12 (e.g. 2 µm thick) and a surface silicon layer 13 (e.g. 0.32 µm thick). Using a lithography and etching technique, housings are etched through layers 12 and 13. Each housing may have a rectangular section 1 µm×3 µm. A <<low stress>> deposit of silicon nitride is then made to fill the previously etched housings and obtain anchor pads 14 which will be used for electrical insulation and the mechanical resistance of the structure.

Figure 3B:
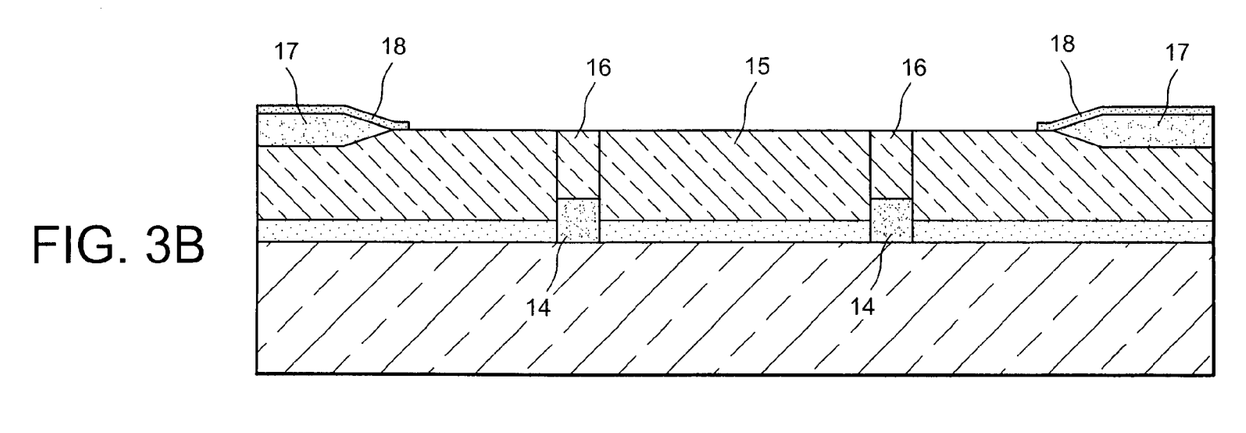

The silicon is then epitaxied to increase considerably the thickness of the surface silicon layer. FIG. 3B shows the layer of silicon 15 obtained, possibly having a thickness of 25 µm. During this epitaxy, the anchor pads 14 are entirely coated with silicon. On these pads 14 silicon areas 16 are therefore formed, these areas locally having more crystalline defects than in the remainder of the epitaxied layer.

Through local oxidation of the silicon (LOCOS), oxide areas 17 are then delimited corresponding to the future conductive lines and to the areas which are to be capacitively uncoupled from the core of the device.

A layer of silicon nitride 18 is then deposited on the oxide areas 17 to protect them against a subsequent etching step.

Figure 3C:
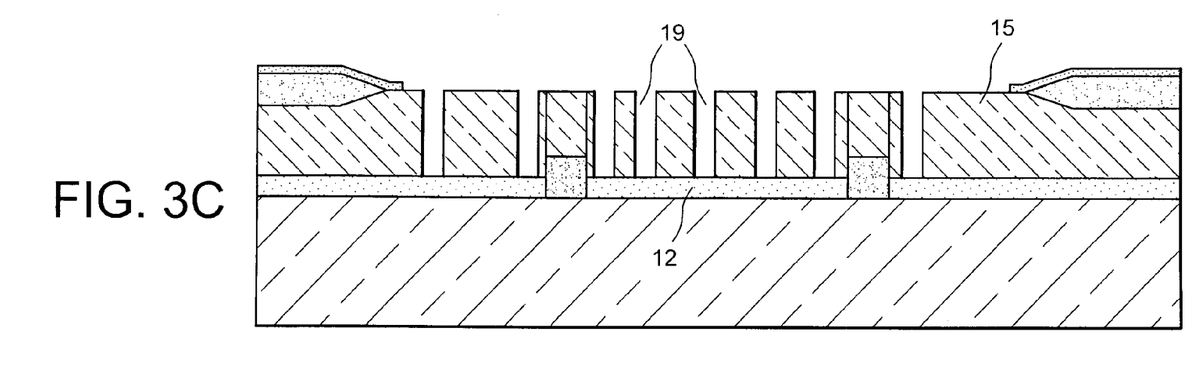

Lithography and deep etching steps are then conducted, e.g. using reactive ionic etching (RIE), of the silicon layer 15 (see FIG. 3C) to expose constituent parts of the MEMS (being an accelerometer for example) and constituent parts of the density sensor. This etching is made in the entire thickness of the silicon layer 15 until the embedded oxide layer 12 is reached. FIG. 3C shows the trenches 19 etched in the silicon layer 15.

Planarization and plugging are then conducted by depositing a phosphosilicate glass layer (PSG). The objective is to achieve a planar surface to facilitate the subsequent steps. This objective is achieved by means of PSG creep properties which plug the upper parts of the trenches 19.

The PSG layer undergoes lithography and etching steps to allow subsequent electric contacting of the interconnections.

A layer of polycrystalline silicon is then deposited on the structure obtained. Lithography and etching steps are then performed on the polycrystalline silicon layer to form the electrodes and interconnections of the MEMS and to form the resistances of the density sensor for which conditions of heat exchange must be as independent as possible from the density of the gas in the cavity. This is particularly true for a density sensor with Wheatstone bridge assembly.

Figure 3D:
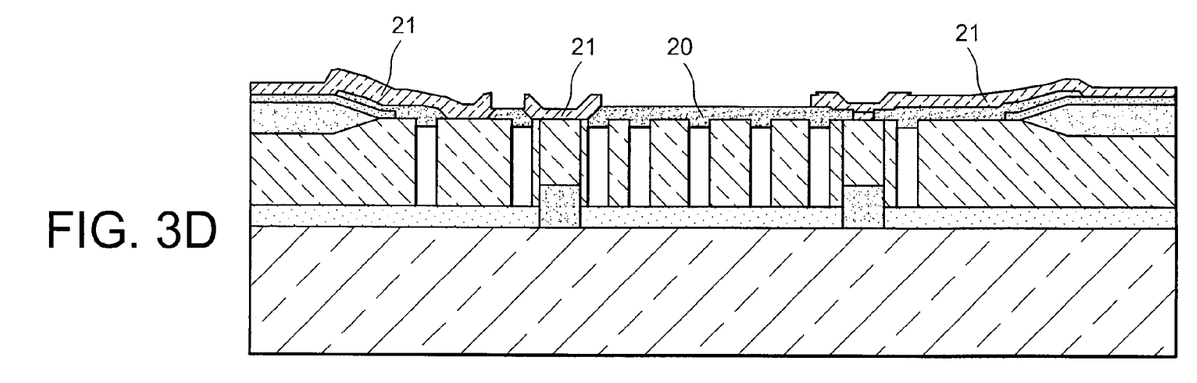

FIG. 3D shows the structure obtained at this stage of fabrication. Reference 20 designates the etched PSG layer. Reference 21 designates the layer of etched polycrystalline silicon.

A second PSG layer is then deposited on the structure obtained. This deposit may be limited to the area intended to form the future cavity, as shown FIG. 3E in which reference 22 designates the second PSG layer. The second PSG layer is lithographed and etched to define bordering areas of the cavity and with a view to forming support pillars for the future cover or lid of the cavity (see holes 23).

Figure 3E:
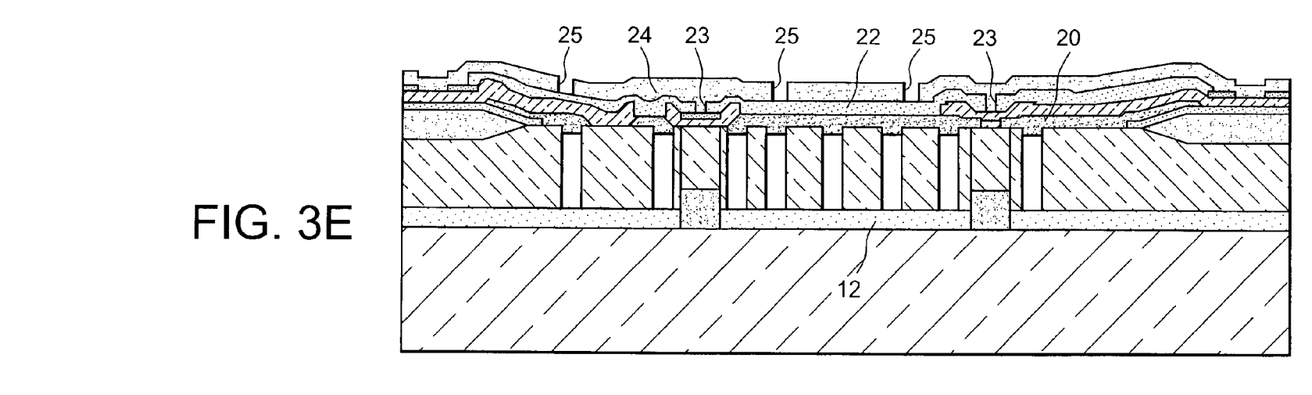

A layer of polycrystalline silicon 24 is then deposited on the structure. This layer will be used to provide the cavity with a lid.

Layer 24 is subjected to a lithography step and holes 25 are made in this layer. These expose the second PSG layer 22.

Figure 3F:
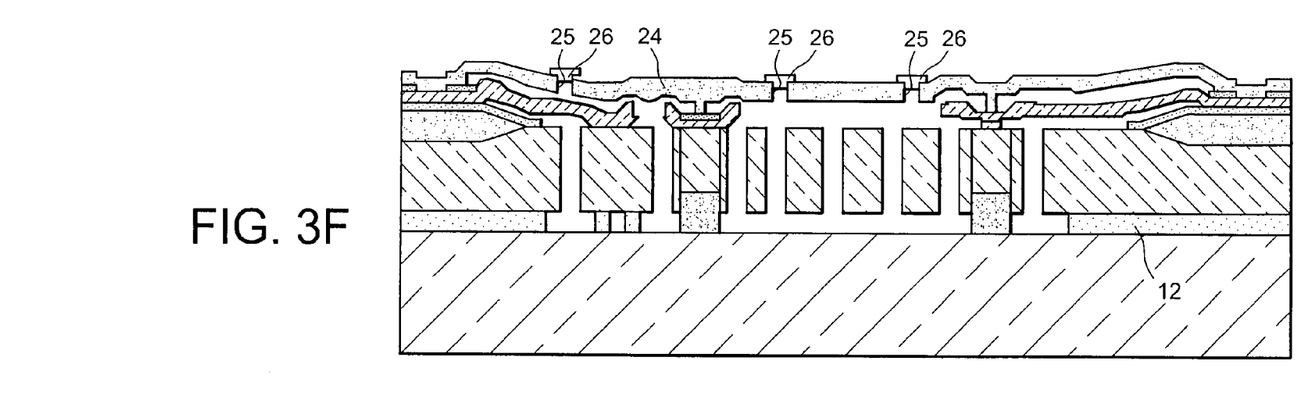

Chemical etching is then successively performed of the second PSG layer 22, the first PSG layer 20 and the embedded oxide layer 12.

The result obtained is shown FIG. 3F. The holes in the lid 24 are plugged with plugs 26. It is then possible to deposit on the lid 24 one or more layers of a material (e.g. polycrystalline silicon) to rigidify the lid and to provide it with improved mechanical resistance.

One very novel, useful aspect of the present invention is the fact that it is possible to fabricate the Pirani sensor during the same fabrication process as for the active element of the MEMS ensuring its prime function. No additional process step and no change to this process is required. All that is needed is to adapt the masks to print structures adapted to the density range it is desired to measure.

The fact that this structure can be made on thick SOI means that the vast majority of thermal power-exchanging surfaces are vertical. Exchange surfaces being equal, this implies a considerable gain in <<vertically>> projected surface space, hence in wafer surface making it possible for example, and inter alia, to reserve maximum space for the main object of the MEMS.

The density range which the sensor of the present invention is able to measure depends directly and chiefly on the space between the heating parts and the cold source. By defining the Knudsen number Kn as the ratio of the mean free path of a gas molecule divided by the geometric space i.e. the distance between the vertical walls of the heating parts and the cold source, the sensitivity of the sensor will be maximal with approximately 0.05<Kn<1. The mean free path of a molecule is a thermodynamic magnitude which is solely dependent on the type of gas and its density. By way of example, it is in the order of 0.1 µm for air under nominal conditions (ambient pressure and temperature). This optimal Knudsen range can easily be translated into a geometric dimension if a priori knowledge is obtained on the density range it is desired to measure. For this purpose, all that is required is to adapt the size of the trench in the thick SOI (namely the geometric space i.e. the distance between the vertical walls of the heating parts and the cold source). It is therefore easy to lower the measurable density considerably, down to values in the order of or less than $10^{-3}$ kg/m3. To lower the measurable density range all that is required is to increase this geometric space, which is easy. The minimal measurable value will in practice be limited by the fact that it is distinctly preferable to have heat transfer via conduction within the predominant gas or gas which is quite simply of importance for total heat transfer. The two other heat transfer modes involved are radiation transfers (which strongly depend on the surface condition of the opposite facing walls and especially on the $4^{th}$ power of the temperature of the hot wall) and transfers by conduction in solids (electric connections and mechanical strengthening devices). These two terms of heat transfers can be easily calculated by those skilled in the art.

It is most important to note that it is fully possible, and advisable in a certain number of applications, to fabricate with one same mask, and hence in the same MEMS, a series of several Pirani sensors, each being adapted to its density range and the whole covering a wide density range.

The invention claimed is:

1. A tightness testing method for an encapsulated MEMS or small component, the MEMS or small component being housed in a cavity of a carrier, the cavity being sealed by a seal and the cavity containing a gas having a different density to the density the gas would have if subjected to the pressure of a medium outside the cavity, the method comprising:
   measuring the density of the gas contained in the cavity, the gas density measuring comprising:
   producing a heat exchange between a hot source present in the cavity and a cold source thermally linked to the cavity, and
   determining a magnitude characteristic of the heat exchange by a temperature measuring device.

2. A testing method as in claim 1, wherein the determining a magnitude characteristic of the heat exchange comprises determining a temperature or temperature changes of the cold source and/or hot source.

3. A testing method as in claim 2, wherein the hot source includes an electric resistance of known resistivity, and the determining the temperature of the hot source is obtained by measuring the voltage applied to terminals of the hot source and current passing through the hot source.

4. A testing method as in claim 3, wherein the electric resistance is supplied with a DC voltage, and measurement of gas density is obtained from thermal resistance through the gas contained in the cavity.

5. A testing method as in claim 1, wherein the hot source includes two electric resistances mounted on two opposite sides of a Wheatstone bridge having a DC voltage input on two opposite top parts, two other electric resistances of the Wheatstone bridge being in contact with the cold source, the voltage measured on the two other opposite top parts of the Wheatstone bridge being used to measure the density of the gas contained in the cavity.

6. A testing method as in claim 2, wherein the hot source includes an electric resistance of known resistivity, a voltage scale is applied to terminals of the hot source, and a time response is measured of the electric resistance forming the hot source to determine the thermal resistance between the hot source and the remainder of the cavity.

7. A testing method as in claim 2, wherein the hot source includes an electric resistance of known resistivity, a sinusoidal voltage is applied to terminals of the hot source and a time response of the electric resistance is measured from which the thermal resistance can be deduced between the hot source and the remainder of the cavity.

8. A testing method as in claim 1, wherein the hot source includes two electric resistances mounted on two opposite sides of a Wheatstone bridge having an AC voltage input on two opposite top parts, two other electric resistances of the Wheatstone bridge being in contact with the cold source, the voltage measured on the two other opposite top parts of the Wheatstone bridge being used to obtain the thermal time response of the hot source, from which the thermal resistance can be deduced between the hot source and the remainder of the cavity.

9. A testing method as in claim 1, wherein the hot source is a hot source fabricated during a fabrication process used to fabricate a main function of the MEMS or small component.

10. A testing method as in claim 5, wherein the electric resistances of the Wheatstone bridge are electric resistances fabricated during a fabrication process used to fabricate the main function of the MEMS or small component.

* * * * *